June 17, 1930.   G. W. EMRICK   1,764,291
DRILL CHUCK
Filed April 24, 1929
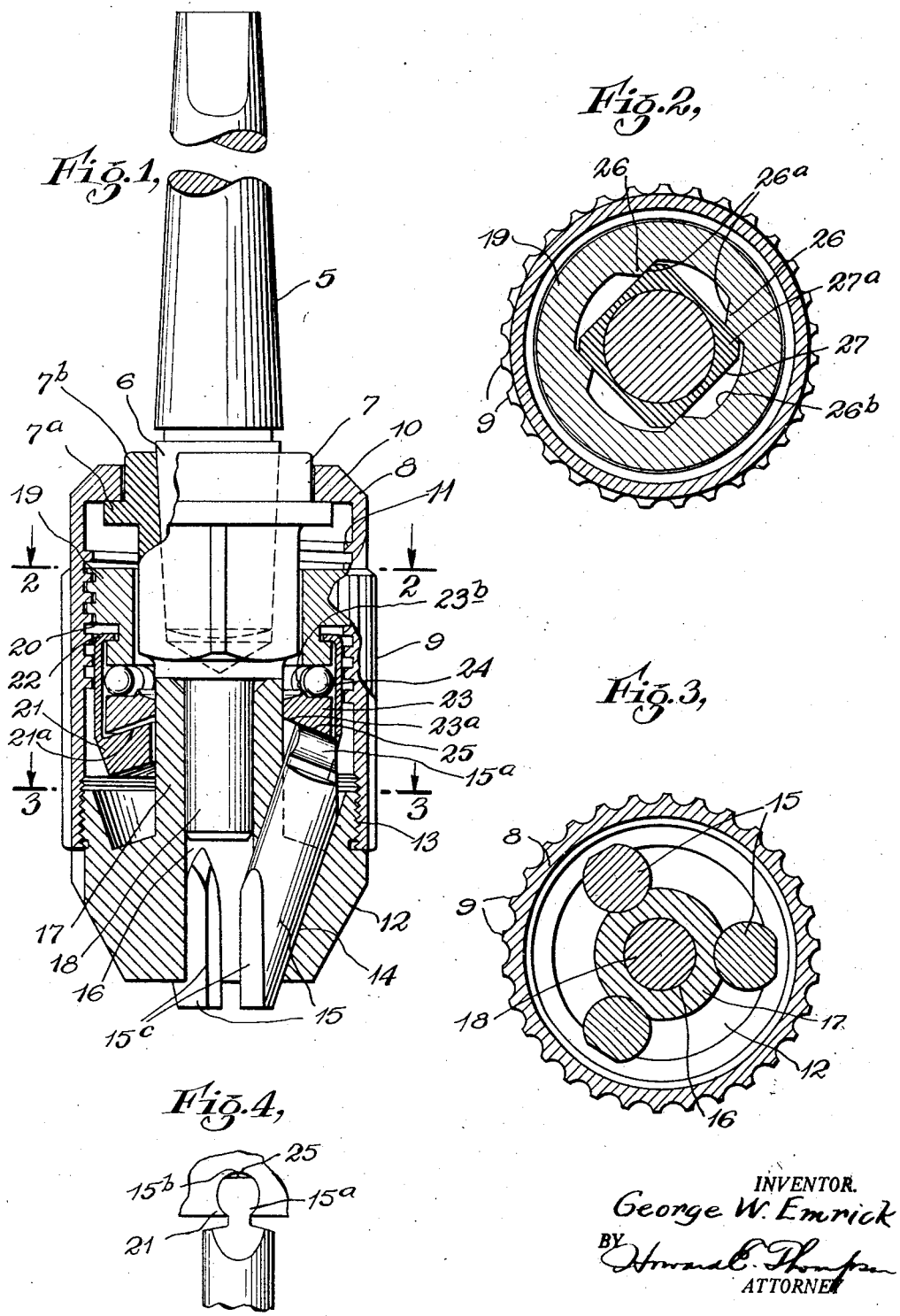
INVENTOR.
George W. Emrick
BY
ATTORNEY Patented June 17, 1930

1,764,291

UNITED STATES PATENT OFFICE

GEORGE W. EMRICK, OF BROOKLYN, NEW YORK, ASSIGNOR, BY MESNE ASSIGNMENTS, TO ETTCO TOOL CO. INC., OF BROOKLYN, NEW YORK, A CORPORATION OF NEW YORK

DRILL CHUCK

Application filed April 24, 1929. Serial No. 357,648.

This invention relates to drill chucks and particularly to devices of this class having means for firmly engaging a drill or other tool and for quickly releasing such tool whenever desired; and the object of the invention is to provide a tool of the class specified involving a plurality of tool gripping jaws having actuating means contained within the casing structure of the chuck so arranged with reference to the casing and each other as to provide for free lateral movement of said parts preventing the possibility of creating lateral frictional engagement between said parts or a frictional engagement which would be greater than the engagement of the jaws with the tool so as to insure a firm and positive engagement of the jaws with the tool at all times; a further object being to provide jaw supporting and operating means within the chuck body involving a freely rotatable and sliding ring, acting as a thrust upon the upper ends of the jaws in such manner as to transmit the thrust in a line parallel with the longitudinal plane of the jaws, also preventing side friction, binding or jamming of the jaws in their support and guide, and further aiding in the proper alinement of the jaw operating means within the chuck casing; a still further object being to provide a jaw operating mechanism involving an annular body having a flat or square screw threaded engagement with the casing of the chuck in such manner as to permit radial movement of said body with respect to the axis of the chuck; a further object of the invention being to provide an improved method of keying and centering said annular screw threaded body to the spindle or a part in which the spindle of the chuck is secured and in such manner as to provide a quick and free release of the jaws of the chuck with the tool whenever desired; and with these and other objects in view, the invention consists in a chuck device of the class and for the purpose specified, which is simple in construction, efficient in use and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a longitudinal, sectional view through a chuck made according to my invention.

Fig. 2 is a transverse, sectional view on the line 2—2 of Fig. 1.

Fig. 3 is a transverse, sectional view on the line 3—3 of Fig. 1; and,

Fig. 4 is a side view of a part of a construction shown in Fig. 1, detached, showing a detail of construction.

In Fig. 1 of the drawing, I have shown at 5 a spindle of the usual or conventional form in connection with which my improved chuck is mounted. The spindle has a tapered end portion 6 which is adapted to be coupled with a spindle receiving part 7 arranged within the casing 8 of the chuck.

The casing 8 is tubular in form, the outer wall being preferably provided with longitudinal ribs 9 to facilitate the rotation of said casing by hand, the upper end of the casing being closed by a cover or ring 10 in which the part 7 is rotatably mounted, the bore of the casing 8 having at its upper end portion an internal square screw thread 11; and a jaw guiding part 12 is in screw threaded engagement with the lower end of said casing as seen at 13, the part 12 having, in the construction shown, three angularly disposed bores or apertures 14 which open through the lower end of said part and into the casing 8 at the upper end thereof and in which jaws 15 are mounted to move longitudinally of said bores.

The part 12 includes a central bore or aperture 16 which limits the size of the drill shank insertable into the chuck, it being understood at this time that the chuck may be made in different sizes. The bore 16 terminates at its upper end in a bearing sleeve 17 in which a stub shaft or trunnion 18 at the lower end of the part 7 is arranged to aline the part 7 with respect to the part 12, and thus centralize the tool with respect to the axis of the spindle 5.

It will be noted in this connection that the part 7 includes a flange 7ᵃ arranged inwardly of the cap or end wall 10 to retain said part against displacement from the casing 8, sufficient clearance being allowed between the flange and the mechanisms within the chuck casing to provide for slight longitudinal movement of the casing with respect to the part 7. This is true of the bearing surfaces between the collar 7ᵇ of the part 7 and the cap or end wall 10.

Arranged within the casing 8 is a jaw operating sleeve 19 which is in screw threaded engagement with the screw threads 11 of the casing 8, this threaded engagement being of a loose character to permit radial movement of the sleeve with respect to the casing, said sleeve having an annular groove 20 adjacent its lower end and opening outwardly through the periphery thereof whereby a supplemental sleeve 21 may be coupled therewith by spinning over the upper end thereof into the groove 20 as seen at 22, thus forming a unit structure of the sleeves 19 and 21 permitting rotary movement thereof one with respect to the other. A ring 23 has a beveled lower surface 23ᵃ, and the enlarged portion of the sleeve 21 has a similar beveled surface 21ᵃ, the beveled surfaces 23ᵃ—21ᵃ being arranged at right angles to the longitudinal axis of the bores 14 or the jaws 15 therein.

Arranged between the upper surface of the ring 23 and the lower surface of the sleeve 19 is a series of bearing balls 24 which are held in position by the coupling of the sleeves 19 and 21 and by a flange 23ᵇ on the ring 23. These balls are free to move radially between the surfaces of the ring 23 and sleeve 19 and take up the thrust exerted upon the jaws 15. All of this structure is clearly seen in Fig. 1 of the drawing.

The lower end of the sleeve 21 is provided with three radially and angularly extending apertures 25 which open outwardly through the lower end of said sleeve, and in which substantially cylindrical heads 15ᵃ on the upper ends of the jaws 15 are mounted and keyed for radial movement with respect to the sleeve 21. The upper faces of the heads 15ᵃ are flattened as seen at 15ᵇ, note Fig. 4, to bear upon the lower surface 23ᵃ of the ring 23 so that the thrust is taken up longitudinally with respect to the jaws to prevent any possible binding of said jaws in their vertical movement in the bores 14. The lower end portions of the jaws 15 are cut away at one side thereof to form angular jaw faces 15ᶜ arranged in a plane parallel to the longitudinal plane of the bore 16 so as to engage the shank of a tool throughout the entire length of the jaw faces. It will be noted on a consideration of Fig. 1 of the drawing, that the upper, outer corner portions of the jaws 15 are cut away to give clearance for the full inward movement of the jaws with respect to the casing as will be apparent. These surfaces are adapted to engage the inner walls of the casing to limit the upward movement of the sleeve 19 to prevent the same from jamming upon the flange 7ᵃ.

The bore of the sleeve 19 is of the cross sectional form clearly seen in Fig. 2 of the drawing and is provided with oppositely disposed inwardly extending shoulders 26 having side walls 26ᵃ. The part 7 where it operates in the sleeve 19 or between the flange 7ᵃ and trunnion 18 is square in cross sectional form as seen at 27, note Fig. 2 of the drawing.

The corner portions 27ᵃ formed by this square cross sectional form are adapted to pass freely within the recesses 26ᵇ formed between the shoulders 26 and to strike up against the beveled surfaces 26ᵃ of each of said shoulders to form the clutch engagement of the part 7 with respect to the sleeve 19 in the operation of moving the jaws 15 into firm engagement with a tool, at the same time permitting the quick and free release of the tool by a sudden blow imparted to the peripheral wall of the casing in a direction which will advance the sleeve 19 upwardly in said casing. The movement of the corners 27ᵃ from the locked position to the releasing position constitutes a hammer blow upon the sleeve 19 by virtue of the free travel of said corner portions from one of the beveled faces of the shoulders 26 to the other beveled faces thereof.

In the above described operation, it will be understood that the sleeve 19 together with the parts carried thereby is free to travel upwardly and downwardly upon the square shank portion 27 of the part 7. As heretofore stated, the chuck device may be made in different sizes to adapt the same for use in connection with tools or work pieces of various kinds and classes insertable into the bore of the chuck.

It will also be understood that my invention is not necessarily limited to the specific structural details herein shown and described nor to the particular arrangement of parts disclosed, and various other changes therein and modifications thereof may be made within the scope of the appended claims without departing from the spirit of my invention or sacrificing its advantages.

Having fully described my invention, what I claim as new and desire to secure by Letters Patent, is:—

1. A chuck of the class described comprising a casing, a spindle receiving part rotatably supported in one end of the casing, jaws slidably supported in the other end of the casing, a jaw operating mechanism arranged in said casing and in operative engagement therewith and with said spindle part to control the movement of the chuck jaws into operative and inoperative positions, said mechanism involving parts movable radially with respect to the casing and each other, one of said parts being in screw threaded engagement with the casing and having a free clutch engagement with said spindle part.

2. A chuck of the class described comprising a casing, a spindle receiving part rotatably supported in one end of the casing, jaws slidably supported in the other end of the casing, a jaw operating mechanism arranged in said casing and in operative engagement therewith and with said spindle part to control the movement of the chuck jaws into operative and inoperative positions, said mechanism involving parts movable radially with respect to the casing and each other, one of said parts being in screw threaded engagement with the casing and having a free clutch engagement with said spindle part, and another part of said mechanism involving a slidable and rotatable ring constituting a thrust bearing for the inner ends of said jaws.

3. A chuck of the class described comprising a casing, a spindle receiving part rotatably supported in one end of the casing, jaws slidably supported in the other end of the casing, a jaw operating mechanism arranged in said casing and in operative engagement therewith and with said spindle part to control the movement of the chuck jaws into operative and inoperative positions, said mechanism involving parts movable radially with respect to the casing and each other, one of said parts being in screw threaded engagement with the casing and having a free clutch engagement with said spindle part, another part of said mechanism involving a slidable and rotatable ring constituting a thrust bearing for the inner ends of said jaws, and bearing balls disposed between said ring and said screw threaded part.

4. A chuck of the class described comprising a casing, a spindle receiving part rotatably supported in one end of the casing, jaws slidably supported in the other end of the casing, a jaw operating mechanism arranged in said casing and in operative engagement therewith and with said spindle part to control the movement of the chuck jaws into operative and inoperative positions, said mechanism involving parts movable radially with respect to the casing and each other, one of said parts being in screw threaded engagement with the casing and having a free clutch engagement with said spindle part, another part of said mechanism involving a slidable and rotatable ring constituting a thrust bearing for the inner ends of said jaws, bearing balls freely disposed between said ring and said screw threaded part, and means for retaining said ring and part together as an assembled unit.

5. A chuck of the class described comprising a casing, a spindle receiving part rotatably supported in one end of the casing, jaws slidably supported in the other end of the casing, a jaw operating mechanism arranged in said casing and in operative engagement therewith and with said spindle part to control the movement of the chuck jaws into operative and inoperative positions, said mechanism involving parts movable radially with respect to the casing and each other, one of said parts being in screw threaded engagement with the casing and having a free clutch engagement with said spindle part, another part of said mechanism involving a slidable and rotatable ring constituting a thrust bearing for the inner ends of said jaws, bearing balls freely disposed between said ring and said screw threaded part, means for retaining said ring and part together as an assembled unit, and said jaws being coupled with and movable radially with respect to said last named means.

6. A chuck of the class described comprising a casing, jaws movable inwardly and outwardly through one end of the casing, means within said casing for controlling the movement of said jaws, a spindle supporting part in the other end of the casing, said part having a square shank portion and one part of said jaw operating means being arranged upon the square shank of said spindle part and having circumferentially spaced shoulders adapted to engage the corners of said square shank part to couple said parts together.

7. A chuck of the class described comprising a casing, jaws movably supported in one end of the casing, a spindle part rotatably mounted in the other end of the casing, a square shank on said part within the casing, a sleeve in screw threaded engagement with said casing and arranged to move longitudinally of said square shank, inwardly projecting shoulders in the bore of said sleeve adapted to cooperate with the corner portions of said shank in coupling said parts together.

8. A chuck of the class described comprising a casing, jaws movably supported in one end of the casing, a spindle part rotatably mounted in the other end of the casing, a square shank on said part within the casing, a sleeve in screw threaded engagement with said casing and arranged to move longitudinally of said square shank, inwardly projecting shoulders in the bore of said sleeve adapted to cooperate with the corner portions of said shank in coupling said parts together, means involving parts rotatably supported in connection with said sleeve for coupling said jaws therewith, said last named means comprising a supplemented sleeve in connection with which said jaws are keyed and radially movable, and a bearing ring disposed between said sleeves and engaging the upper ends of said jaws.

9. A chuck of the class described comprising a casing, jaws movably supported in one end of the casing, a spindle part rotatably mounted in the other end of the casing, a square shank on said part within the casing, a sleeve in screw threaded engagement with said casing and arranged to move longitudinally of said square shank, inwardly projecting shoulders in the bore of said sleeve adapted to cooperate with the corner portions of said shank in coupling said parts together, means involving parts rotatably supported in connection with said sleeve for coupling said jaws therewith, said last named means comprising a supplemental sleeve in connection with which said jaws are keyed and radially movable, a bearing ring, disposed between said sleeves and engaging the upper ends of said jaws, and bearing balls between the first named sleeve and said ring.

10. A chuck of the class described comprising a casing, jaws movably supported in one end of the casing, a spindle part rotatably mounted in the other end of the casing, a square shank on said part within the casing, a sleeve arranged in the casing and having external square threads in screw threaded engagement with said casing and movable longitudinally of said square shank and radially of the casing, inwardly projecting shoulders in the bore of said sleeve adapted to cooperate with the corner portions of said shank in coupling said parts together, and a supplemental sleeve with which said jaws are coupled, said sleeve including a skirt portion coupled with the first named sleeve and rotatable with respect thereto.

11. A jaw operating mechanism for chucks comprising a casing, a sleeve in free screw threaded engagement with the casing of the chuck for vertical adjustment in said casing, said sleeve also having free radial movement in the casing, a jaw supporting body coupled with said sleeve and in connection with which said sleeve is rotatable, said body having at its lower end a plurality of radially arranged apertures which are inclined upwardly and inwardly and open outwardly through the lower end of said body, and the jaws to be operated being arranged angularly in the casing with their free ends converging and extending at right angles to the inclination of the apertures in said body, said jaws having head portions at their upper ends arranged to move radially in said apertures in moving the converging ends of said jaws toward and from each other.

12. The combination with a spindle supporting part of a chuck of the class described having a shank of angular cross sectional form and a casing in which said part is rotatable, of a jaw actuating mechanism in said casing and involving an operative part in screw threaded engagement with said casing and slidably engaging said angular shank and said last mentioned part having shoulder portions adapted to clutch said shank to limit free rotary movement of said parts one with respect to the other.

In testimony that I claim the foregoing as my invention I have signed my name this 22nd day of April 1929.

GEORGE W. EMRICK.